(12) United States Patent
Barker et al.

(10) Patent No.: US 7,830,245 B2
(45) Date of Patent: Nov. 9, 2010

(54) SYSTEM AND METHOD FOR POSITIONING A VEHICLE OPERATOR

(75) Inventors: Stephen D. Barker, Highlands Ranch, CO (US); Harry Sakjas, New Boston, MI (US)

(73) Assignee: Performance Driving Position LLP, Highlands Ranch, CO (US)

( * ) Notice: Subject to any disclaimer, the term of this patent is extended or adjusted under 35 U.S.C. 154(b) by 0 days.

(21) Appl. No.: 11/080,073

(22) Filed: Mar. 14, 2005

(65) Prior Publication Data

US 2006/0206251 A1 Sep. 14, 2006

(51) Int. Cl.
*B60Q 1/00* (2006.01)
(52) U.S. Cl. .................. 340/439; 340/5.52; 340/5.72; 701/1; 180/271
(58) Field of Classification Search ............... 340/439, 340/5.52, 5.72; 701/1; 180/271
See application file for complete search history.

(56) References Cited

U.S. PATENT DOCUMENTS

| | | | | |
|---|---|---|---|---|
| 5,748,473 A | * | 5/1998 | Breed et al. | 701/45 |
| 6,759,943 B2 | * | 7/2004 | Lucy et al. | 340/5.72 |
| 2004/0128065 A1 | * | 7/2004 | Taylor et al. | 701/201 |
| 2005/0017842 A1 | * | 1/2005 | Dematteo | 340/5.72 |
| 2006/0273880 A1 | * | 12/2006 | Yuhara | 340/5.83 |

* cited by examiner

*Primary Examiner*—Travis R Hunnings
(74) *Attorney, Agent, or Firm*—Dorsey & Whitney LLP

(57) ABSTRACT

Systems and methods for placing a vehicle operator into an performance driving position for a particular vehicle by adjusting equipment on the vehicle based on various combinations of biometric parameters of the vehicle operator. In one embodiment, the performance driving position for a particular vehicle is first determined and is stored in a processing device or associated memory. The vehicle operator may enter required biometric parameters into an input device operably connected to the processing device, which in turn calculates the vehicle operator's present location and any movement of the seating elements, controls, and set forth necessary to place the vehicle operator in an performance driving position. The processing device then sends one or more output signals to one or more motors associated with one or more seating elements or controls to adjust such equipment and place the operator in the performance driving position.

42 Claims, 10 Drawing Sheets

SYSTEM AND METHOD FOR POSITIONING A VEHICLE OPERATOR

BACKGROUND OF THE INVENTION a. Field of the Invention

This invention is generally related to vehicle seating positioning systems, and more particularly to systems and methods for positioning a vehicle operator and/or seating surface in an optimum operating position for a particular vehicle based on one or more biometric parameters of the operator.

b. Background Art

Many vehicles, such as automobiles, are currently designed with an area designated as an optimal or near-optimal vehicle operating position. (This is also referred to as the "performance driving position" or simply "optimal vehicle operating position.") As described in more detail below, the optimal vehicle operating position is typically the area within the vehicle that provides the driver with an optimal visual perspective of the roadway or various instrumentation in the vehicle.

Vehicles are often provided with some means to enable the driver to adjust his or her position within the vehicle to improve his or her view of and/or ability to reach the controls, as well as view vehicle mirrors and/or travel surfaces (such as roads). Many vehicles utilize electric motors to allow the driver to manually adjust a driver's seat into various positions. Other vehicles also allow the driver to adjust the positions of the rear view mirrors, steering wheel, and/or foot pedals.

Technological improvements have also improved the driver's ability to create a preferred operating position. For example, some automobiles may store a particular driver's preferred position for the various instruments (including, for example, pedals, a steering wheel, and mirrors), as well as a seat position. However, such systems may require relatively tedious trial-and-error by the operator to determine such positions. Even when preferred positions are determined, they may not correspond to an operator's optimal driving position.

Accordingly, there is a need in the art for an improved vehicle operator positioning system.

BRIEF SUMMARY OF THE INVENTION

The present invention provides systems and methods for placing a vehicle operator into an optimal or near-optimal vehicle operating position ("performance driving position") based on at least various combinations of biometric parameters of the vehicle operator.

In one aspect of the present invention, an automatic positioning system for a vehicle operator includes an operator's seat, an input device adapted to produce at least one input signal based on at least one biometric parameter, at least one processing element connected with the input device and adapted to process the at least one input signal based on an performance driving position to produce at least one output signal, and wherein the at least one output signal includes at least one control signal adapted to move the operator's seat. The automatic positioning system may further include a means for mapping the at least one biometric parameter and a storage device for storing the at least one biometric parameter. In addition, the means for mapping the at least one biometric parameter can be a scanning and digitizing device. Further, the storage device can be portable. For example, the storage device can be located on a vehicle ignition key.

In another form, the present invention provides a positioning system for an automobile operator including a driver's seat, an instrument (such as a steering wheel, a foot pedal, or a mirror), a processor adapted to produce at least one output signal based on an performance driving position in combination with one of an inseam length, a height, a sleeve length, and at least one motor operative to receive the at least one output signal and, in response, adjust the instrument. The positioning system may further include a means for mapping at least one biometric parameter and a storage device for storing the at least one biometric parameter. In addition, the means for mapping the at least one biometric parameter can be a scanning and digitizing device. Further, the storage device can be portable. For example, the storage device can be located on a vehicle ignition key.

In yet another form, the present invention provides a method of automatically positioning an operator in a vehicle. The method includes the steps of creating an input signal from a biometric parameter, processing the input signal based on an optimum operating position to produce at least one output signal, and moving a seat based on said output signal. The method may also include the steps of measuring the at least one biometric parameter and storing the at least one biometric parameter.

The features, utilities, and advantages of various embodiments of the invention will be apparent from the following more particular description of embodiments of the invention as illustrated in the accompanying drawings and defined in the appended claims.

DETAILED DESCRIPTION OF THE INVENTION

Figure 1A:
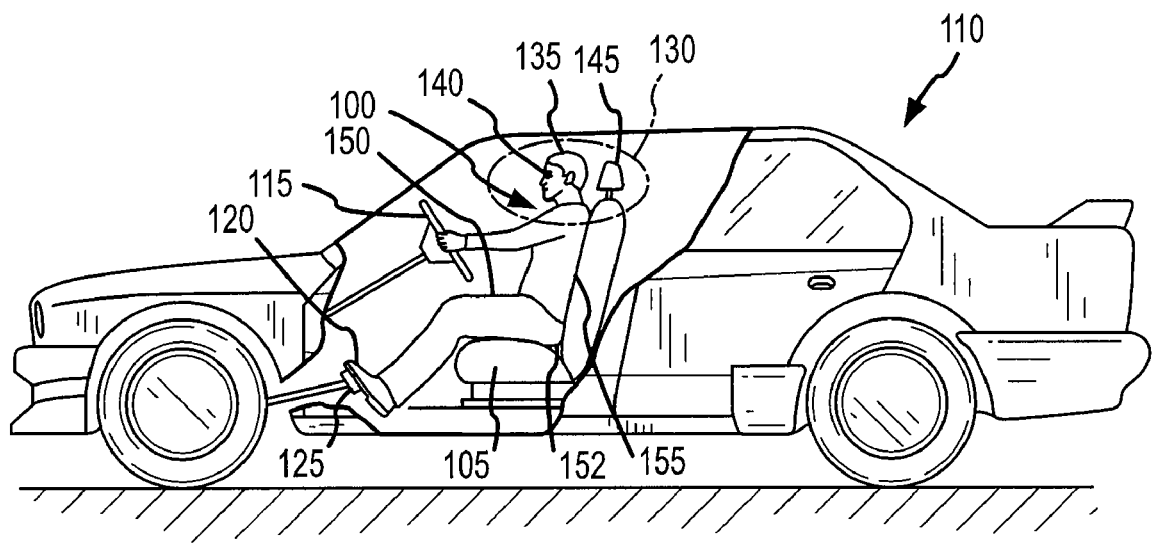
FIG. 1A is a left side cross-sectional, view of an automobile, showing a vehicle operator seated therein in a performance driving position.

Systems and methods disclosed herein are utilized by the invention to place a vehicle into an optimal or near-optimal vehicle operating position by adjusting equipment on the vehicle based on various combinations of biometric parameters of the vehicle operator. In an exemplary embodiment, the optimal vehicle operating position for a particular vehicle is first determined and is stored in a processing device or associated memory. The vehicle operator may enter required biometric parameters into an input device operably connected to the processing device, which in turn calculates the vehicle operator's present location and any movement of the seating elements, controls, and so forth necessary to place the vehicle operator in a performance driving position. The processing device may take the form of a stand-alone or portable digital scanner capable of substantially automatically determining the required biometric parameters by scanning the intended operator. The scanner may, for example, employ laser technology to scan a potential vehicle operator.

The processing device sends one or more output signals to one or more motors associated with one or more vehicle elements or instruments (such as a seat, steering wheel, front pedal, or mirror) or controls to adjust such equipment and place the operator in the optimal vehicle operating position.

Optionally, position feedback (or any form of feedback loop) may be employed to facilitate attaining an optimum vehicle operator position, for example by monitoring motor element movement, position, and/or rate of change of movement. Additionally, the embodiment may store a unique optimum vehicle operator position for one or more operators in the processing element or associated memory. Such operating positions may be recalled (and the seating and/or control elements accordingly configured) via the input device or other appropriate device. Although the systems and methods are described below mainly with reference to automobiles, the present invention can be applied to other vehicles. For example, the present invention is applicable to trucks, boats, airplanes, railroad cars or trains, and heavy equipment such as forklifts, cranes, bulldozers, graders, tanks, and any form of mass or individual transit.

Various criteria may be used to locate the optimum operating position for the vehicle operator of a particular type of vehicle. For example, the performance driving position may be based on a position that provides the vehicle operator with a least restricted view from a driver's seat. In some embodiments, the least restricted view is a view of a vehicle travel surface, a plurality of views through various windows in the vehicle, or a combination thereof. In another embodiment, the least restricted view is an optimum view of selected instrumentation within the vehicle. In yet another embodiment, the performance driving position is based on placing the operator within reach of selected instrumentation. In still another embodiment, the optimum vehicle operating system may be based on a combination of any (or all) of the aforementioned factors. Accordingly, as used herein, the terms "optimum operating position" or "optimal operating position" refer to a position in which a vehicle operator's ability to operate or control a vehicle is in some manner enhanced, or the vehicle operator's ability to view an instrument, mirror, or travel surface is enhanced. It should be noted that "placing" a vehicle operator in an optimal vehicle operating position may not require moving or adjusting the position of the operator. For example, some vehicle operators may be placed in an optimal vehicle operating position simply by adjusting the positioning of mirrors, steering, instrumentation, or control elements (such as a steering wheel), and so forth.

A specific example of an optimal vehicle operating position/performance driving position for an exemplary automobile is shown in FIG. 1A. The vehicle operator 100 is shown from the left side while seated in the driver's seat 105 of an automobile 110, which is shown in cross-section for illustrative purposes. As is typically the case when driving an automobile, the vehicle operator is seated in front of a steering wheel 115 with his foot 120 placed on a foot pedal 125. The optimal vehicle operating position 130 is depicted by an ellipse (shown in dashed lines) near the vehicle operator's head 135. Simultaneously, the operator's hips should be located at or near a hip point. The hip point is the optimal position in which an operator's hips sit to position the lower body for vehicle operation.

When the vehicle operator's eyes 140 are located inside the ellipse (and his hips at the hip point), the operator 100 is said to be within the optimal vehicle operating position 130. The present invention places the vehicle operator within the optimal vehicle operating position by adjusting the positions of various equipment, seating elements, and/or controls in the vehicle. For example, one embodiment of the present invention adjusts the position of the driver's seat 105 to place the vehicle operator 100 within the optimal vehicle operating position 130, and then adjusts the positions of the steering wheel 115, foot pedals 125, and mirrors 300 so they are within sight and/or reach of the vehicle operator 100.

From individual to individual, human bodies have widely varying shapes and sizes. For example, most people are taller, shorter, wider, or thinner than a calculated average-sized human. A range of human body sizes has been calculated in which 95% of human beings fall, called the "95% size category." U.S. automobile manufacturers typically design automobiles to safely accommodate people whose biometric parameters fall within the 95% size category. Further, many manufacturers worldwide design automobiles to accommodate people whose biometric parameters place them within a "99% size category." This category enables 99% of all people, excluding only the 1% whose physical attributes render them exceptionally tall, short, large and so forth.

Figure 1B:
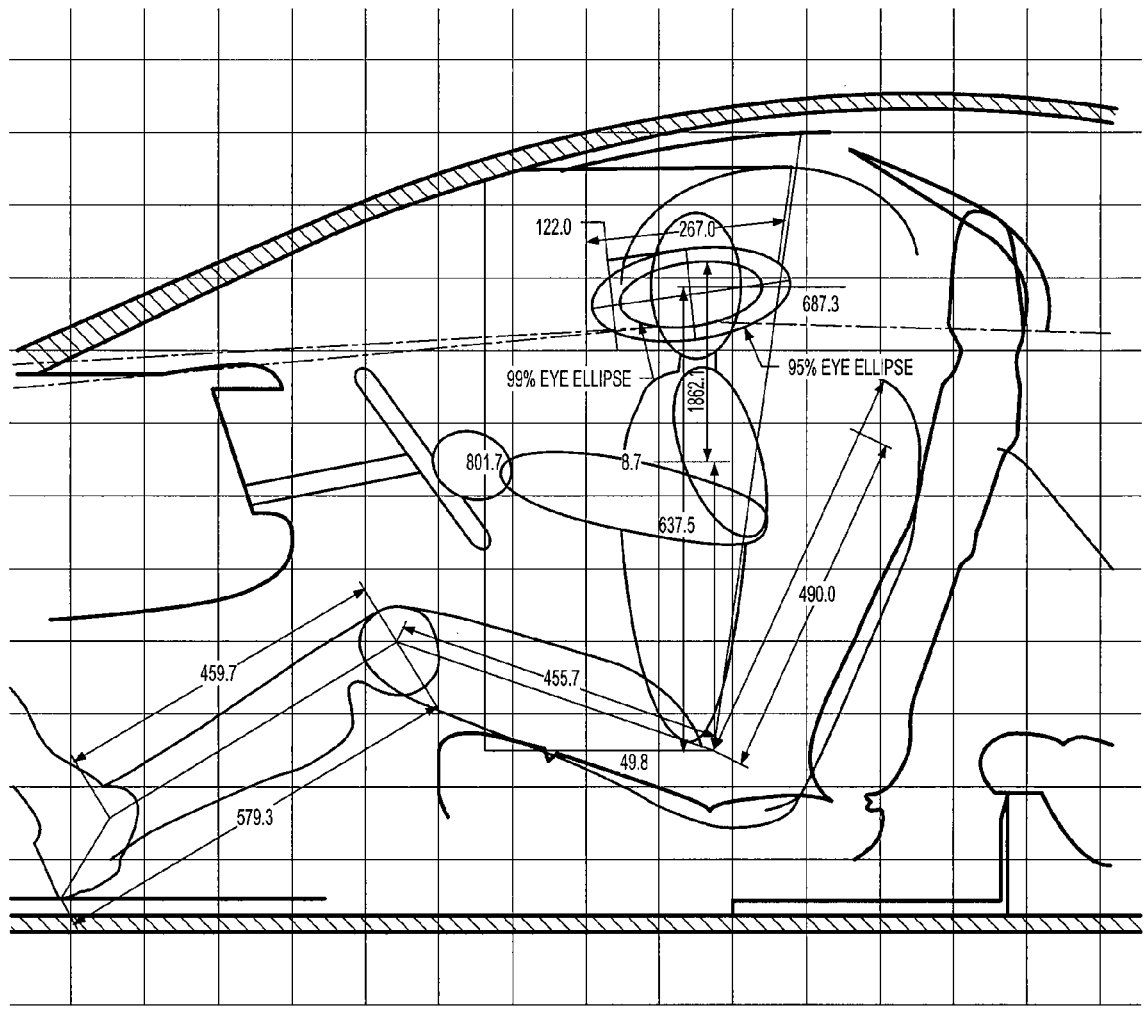
FIG. 1B is a left side cross-sectional view of an automobile, showing specific dimensions relating to the location of a performance driving position.

FIG. 1B shows a detailed example with specific dimensions (in millimeters) locating a 95% eye ellipse and a 99% eye ellipse within an exemplary sedan. It is to be appreciated that the placement of the 95% eye ellipse and the 99% eye ellipse shown in FIG. 1B and associated dimensions correspond with an exemplary sedan and that the optimal vehicle operating positions may vary by make and model of automobiles. The 95% eye ellipse and the 99% eye ellipse shown in FIG. 1B correspond with the optimal vehicle operating positions for people within the "95% size category" and the "99% size category," respectively, as discussed above. The locations of the of the 95% eye ellipse and the 99% eye ellipse shown in FIG. 1B are based on an optimum placement of a vehicle operator relative to the instrumentation in the illustrated automobile. Generally speaking, the 99% ellipse has a major axis of 267.0 mm, and a minor axis of 127.0 mm, which may vary based upon the make and model of automobile. As shown in FIG. 1B, the 95% ellipse has a major axis and a minor axis that are smaller than those of the 99% ellipse. The eye ellipses' major axis may extend at various angles relative to a plane parallel to the floor of the vehicle.

Dimensions of a person's body positioned within the vehicle may also be used to help properly place the eye ellipses within the vehicle. Various dimensions associated with a generic individual's body are illustrated in the schematic representation shown in FIG. 1B. In particular, the distance from the individual's heel to his knee joint is approximately 560 mm. In addition, the individual is shown to have a tibia length of approximately 460 mm and a femur length of roughly 458 mm. The tibia and femur are separated by a generally obtuse angle. Further, the distance from the individual's hip joint to the top of the individual's spine is shown to be approximately 490 mm, and the angle between the spine and femur is shown to be approximately a right angle. These dimensions are exemplary, insofar as no two people have the same body measurements. The present embodiment, when supplied with similar measurements for an operator, may adjust a variety of driving elements (such as pedals, a steering wheel, car seat, and so forth) to accommodate the user's dimensions.

Figure 2:
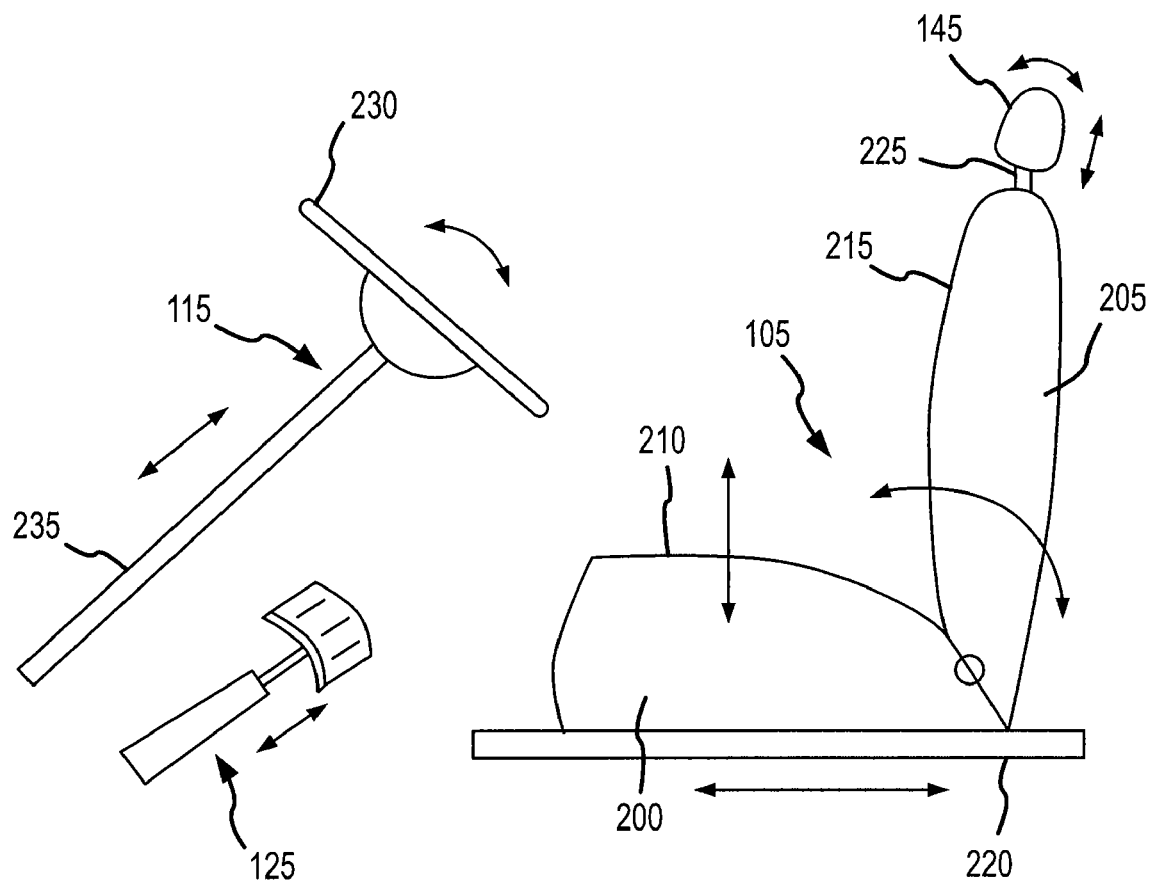
FIG. 2 is a left-side view of a steering wheel, foot pedal, and seat suitable for use with a first embodiment of the invention, wherein the arrows indicate directions of possible motion.
Figure 3:
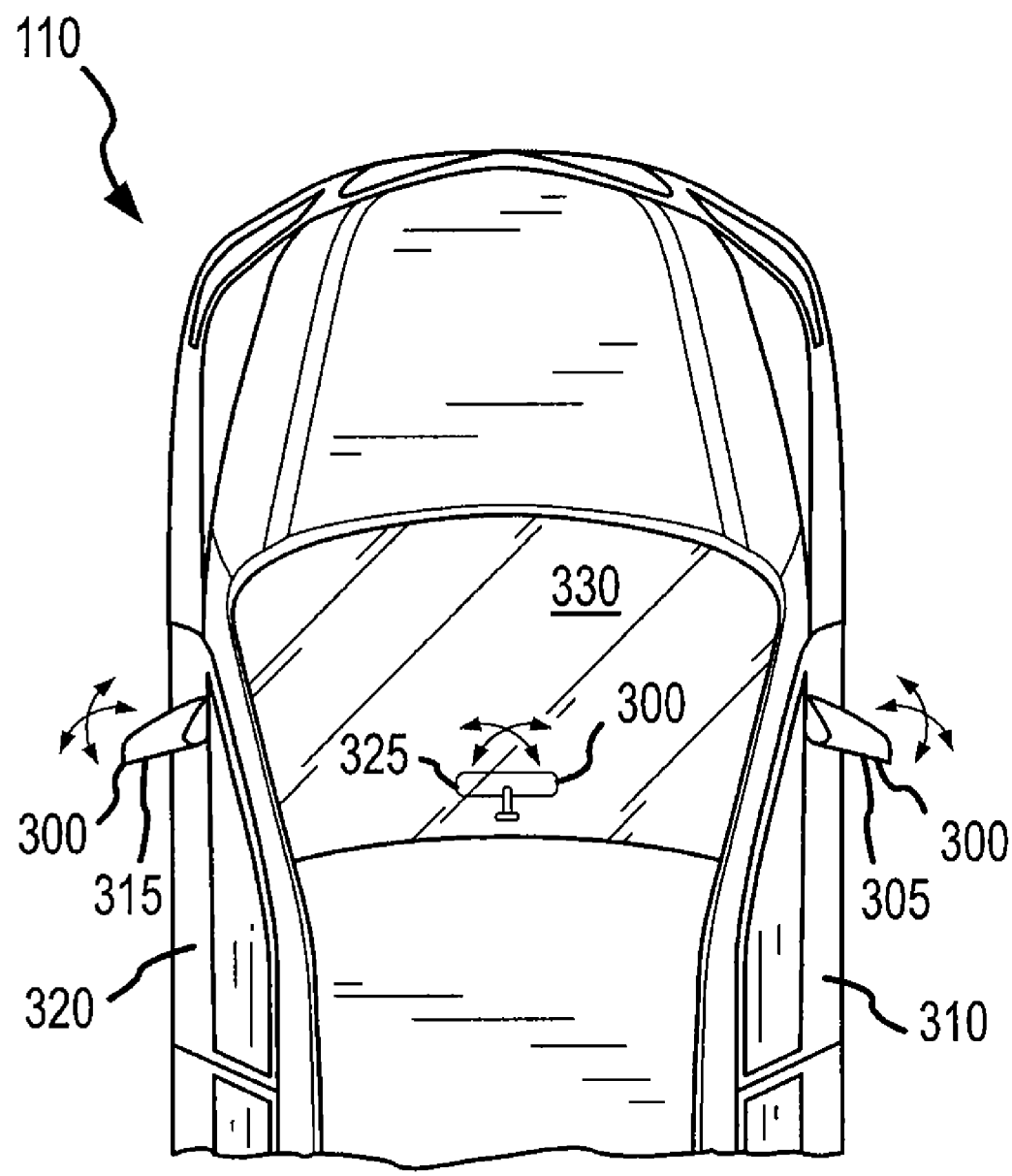
FIG. 3 is a top view of a front portion of the automobile of FIG. 1A showing external and internal rear-view mirrors, wherein the arrows indicate directions of possible motion.

As previously mentioned, the present embodiment may maneuver various equipment in vehicles in any number of combinations in order to place the operator 100 into the optimal vehicle operating position 130. Many automobiles known in the art utilize electric motors to allow the vehicle operator to adjust the driver's seat 105, headrest 145, steering wheel 115, foot pedals 125, and mirrors 300 from a control knob or lever located on a door or a dashboard of the automobile 110. FIGS. 2 and 3 show the various directions in which the driver's seat 105, steering wheel 115, foot pedals 125, mirrors 300, and headrest 145 of the automobile 110 can be adjusted (generally shown by arrows). For example, FIG. 2 illustrates the directions in which the driver's seat 105 can be tilted along with the directions for the headrest 145 tilt.

The driver's seat 105 shown in FIGS. 1 and 2 includes a seat portion 200 and a back portion 205. When the vehicle operator 100 is positioned in the driver's seat facing forward (i.e., toward the steering wheel 115), his upper legs 150 and posterior 152 are placed on an upper surface 210 of the seat portion 200, as generally shown in FIG. 1A. A vehicle operator's back 155 rests against the front 215 of the back portion 205 of the driver's seat 105. The seat portion is connected with a floor 220 of the automobile and can slide in a forward and a rear direction. The seat portion 200 may also include a lift (not shown) that moves the seat portion up and down relative to the floor. The back portion 205 is typically pivotally connected with the seat portion 200 and may pivot relative to the seat portion, forward and backward in the directions shown by the curved arrow in FIG. 2. The driver's seat 105 thus typically allows the vehicle operator 100 to adjust his position up or down, and forward or backward, as well as pivoting his torso forward and backward relative to his legs 150.

The headrest 145 depicted in FIG. 2 is typically pivotally mounted on a headrest member 225 that is telescopically connected with the back portion 205 of the driver's seat 105. The headrest can pivot about the headrest member in the directions shown in FIG. 2. Because the headrest member 225 is telescopically connected with the back portion of the seat, the headrest member can move up and down relative to the back portion 205 in the directions shown. Although the headrest 145 can be used to help position the vehicle operator 100 at the optimal vehicle operating position 130, the location of the headrest can also be utilized to minimize vehicle operator injury in the event of an accident.

As shown in FIG. 2, the steering wheel 115 generally includes a wheel portion 230 and a column portion 235. The wheel portion may be pivotally connected to the column portion and pivotable relative to the column portion in the directions shown in FIG. 2 (that is, pivoting such that either the top or bottom portions of the steering wheel may be angled towards or away from the column). The column portion 235 may also extend outward and retract inward in the directions shown. In some embodiments, the wheel portion 230 does not pivot about the column portion. Instead, the column portion 235 may pivot about a point located at an end of the column portion, opposite the wheel portion.

In some automobiles, the foot pedals 125, such as an accelerator pedal and a brake pedal, are adjustable. For example, the foot pedal shown in FIG. 2 can be adjusted in and out relative to the seat 105 in the directions shown. In other automobiles, the foot pedals 125 may be angularly adjustable.

Rearview mirrors 300 allow the vehicle operator 100 to see behind the automobile 110 without having to physically turn and look backwards while operating the automobile. Many automobiles, such as the automobile 110 shown in FIG. 3, include a right side mirror 305 located near a passenger door 310, a left side mirror 315 located near a driver's door 320, and a central mirror 325 located on an upper central location of a windshield 330. Typically the rearview mirrors (and central mirror) are pivotally mounted to posts with a ball-joint connection, which may be motorized or otherwise automated, permitting the operator 100 to control the mirror operation from within the automobile 110. The ball-joint connection allows the mirrors 300 to pivot about the post in at least two axes, as shown in FIG. 3.

As previously mentioned, the present invention utilizes biometric parameters to calculate how far and in what direction the vehicle operator 100 must be moved in order to be placed in the optimal vehicle operating position 130. In one embodiment, the invention utilizes the vehicle operator's inseam length 415 and height 420 to calculate a torso length 700 in order to place to the vehicle operator in the optimal vehicle operating position. Once the vehicle operator 100 is placed in the optimal vehicle operating position 130, other devices on the vehicle (such as the foot pedals 125, head rest 145, and mirrors 300) may be automatically maneuvered to be within the reach and sight of the vehicle operator, or otherwise placed in an optimal operating position. For example, the embodiment may maneuver such devices to place an operator's eye in the aforementioned eye ellipse, and/or his hips at the hip point. In some embodiments, the sleeve length 425 is also used to place the steering wheel 115 within reach of the vehicle operator 100.

Figure 4:
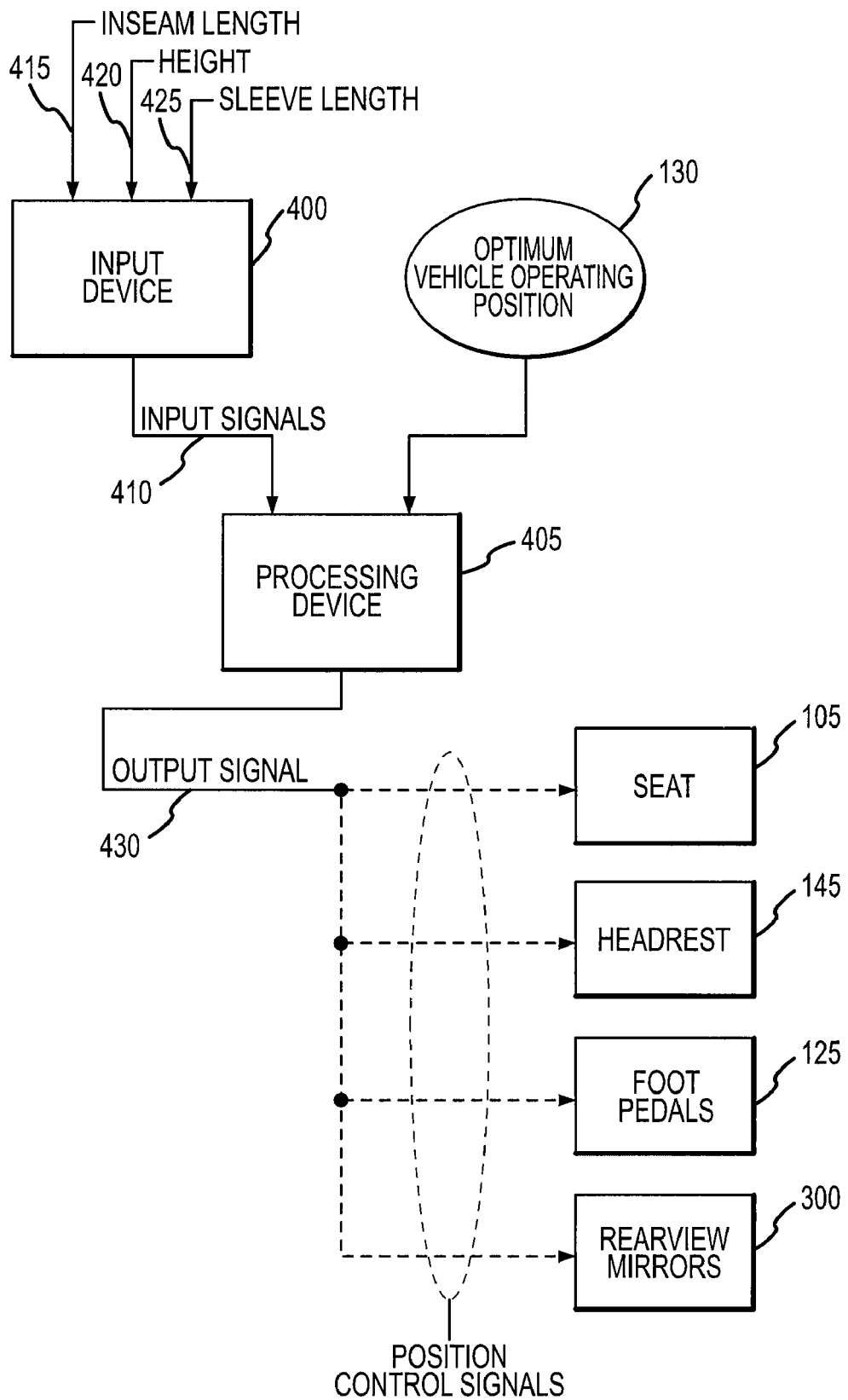
FIG. 4 is a block diagram illustrating a vehicle operator positioning system according to the first embodiment of the invention.

A system according to one embodiment of the present invention is depicted in FIG. 4. The system includes an input device 400 and a processing device 405. The input device is adapted to produce input signals 410 based on biometric parameters entered by the vehicle operator 100. These parameters are used to place the operator in a specific driving position, wherein the operator can operate the vehicle and see instrumentation and travel surfaces effectively. For example, the operator may be positioned with his eyes in the eye ellipse and hips at the hip point. This equates to the performance driving position. The performance driving position generally enhances an operator's control of and over the vehicle, as well as his situational awareness of his surroundings. The performance driving position, therefore, may permit an operator to drive a vehicle more safely, more accurately, and/or with better results.

As shown in FIG. 4, the input device 400 is configured to accept the vehicle operator's inseam length 415, height 420, and sleeve length 425. However, alternate embodiments may be configured to accept other biometric parameters, more or fewer biometric parameters, or some or all of the biometric parameters enumerated herein in combination with additional parameters, depending on the application. The input device 400 communicates the input signals 410 to the processing device 405. In embodiments where the processing device includes a memory (not shown), the optimal vehicle operating position 130 may be stored in the memory. Alternately, the optimal vehicle operating position may be entered into the input device along with the required biometric parameters. Yet other embodiments permit entry of the optimal vehicle operating position 130 into the input device 400 and subsequent storage thereof in the memory.

As shown in FIG. 4, the processing device 405 generates an output signal 430 based on the entered biometric parameters and the optimal vehicle operating position 130. The output signal is then used to control the position of equipment on the vehicle 110 to place the vehicle operator 100 in the performance driving position. As shown in FIG. 4, the output signal 430 may be used to control (for example) at least one of the positions of the driver's seat 105, the headrest 145, the foot pedals 125, and the rearview mirrors 300. Accordingly, the processing device may adjust any or all of these elements to facilitate placing the driver 100 in an optimal position. One example of such control and adjustment is discussed below with respect to FIGS. 6-9.

Figure 5:
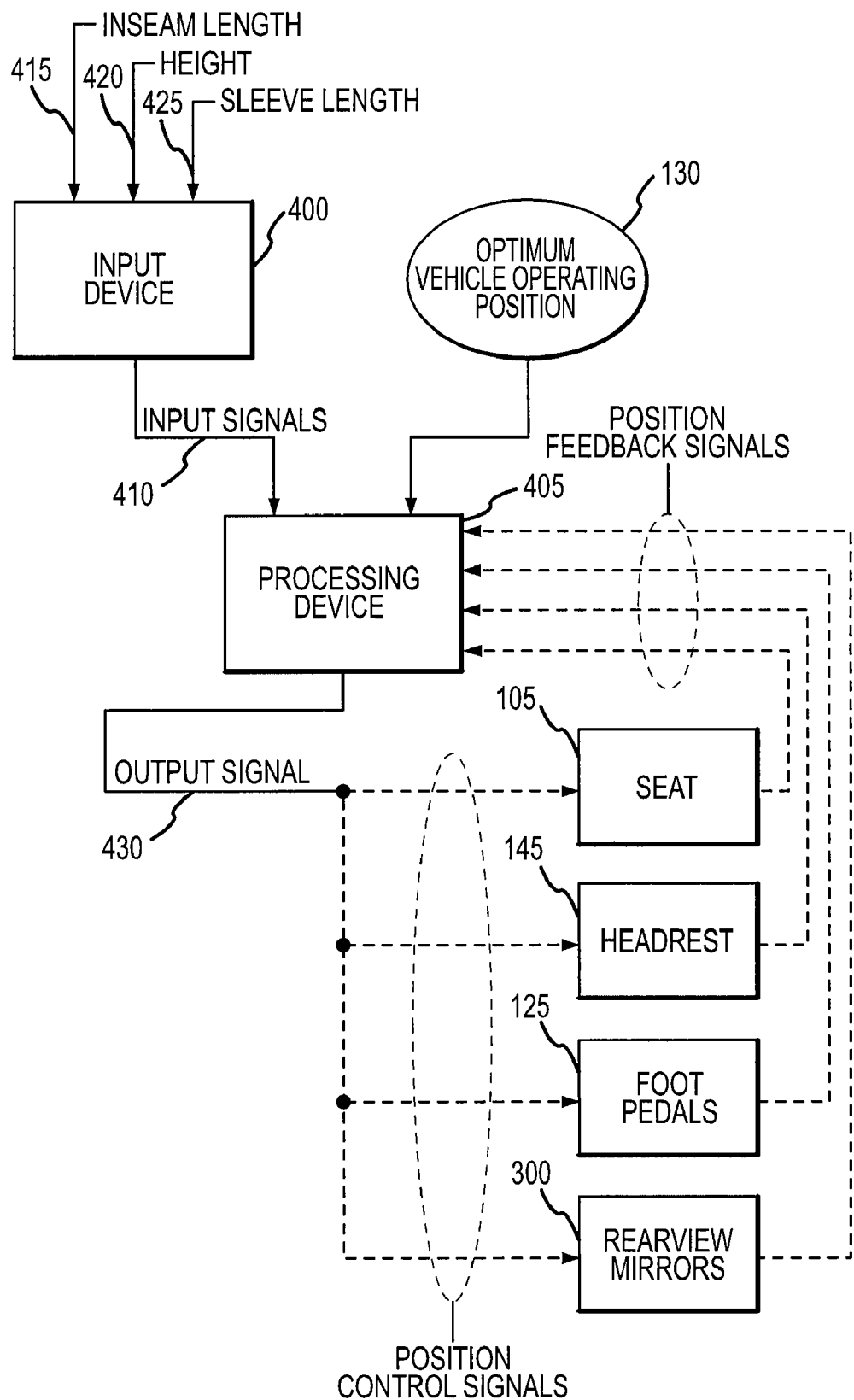
FIG. 5 is a block diagram illustrating a vehicle operator positioning system according to a second embodiment of the invention, employing position feedback.

In some embodiments, position feedback sensors are located on (or otherwise connected to) the equipment to be adjusted, as shown in FIG. 5. The position feedback sensors communicate with the processing device 405 so that the processing device can determine a vehicle operator's 100 present position. As such, the processing device utilizes the position feedback sensors in a closed-loop control scheme to place the vehicle operator in the performance driving position 130. When feedback sensors are not available on equipment, the processing device 405 utilizes an open-loop control scheme (i.e. that shown in FIG. 4) to place the operator in the performance driving position.

Depending upon the required application, the present invention may utilize various combinations of biometric parameters and vehicle equipment to place the vehicle operator 100 in the performance driving position 130. For example, the methodology used in one embodiment of the present invention is illustrated in the flowcharts depicted in FIGS. 6-9.

Figure 6:
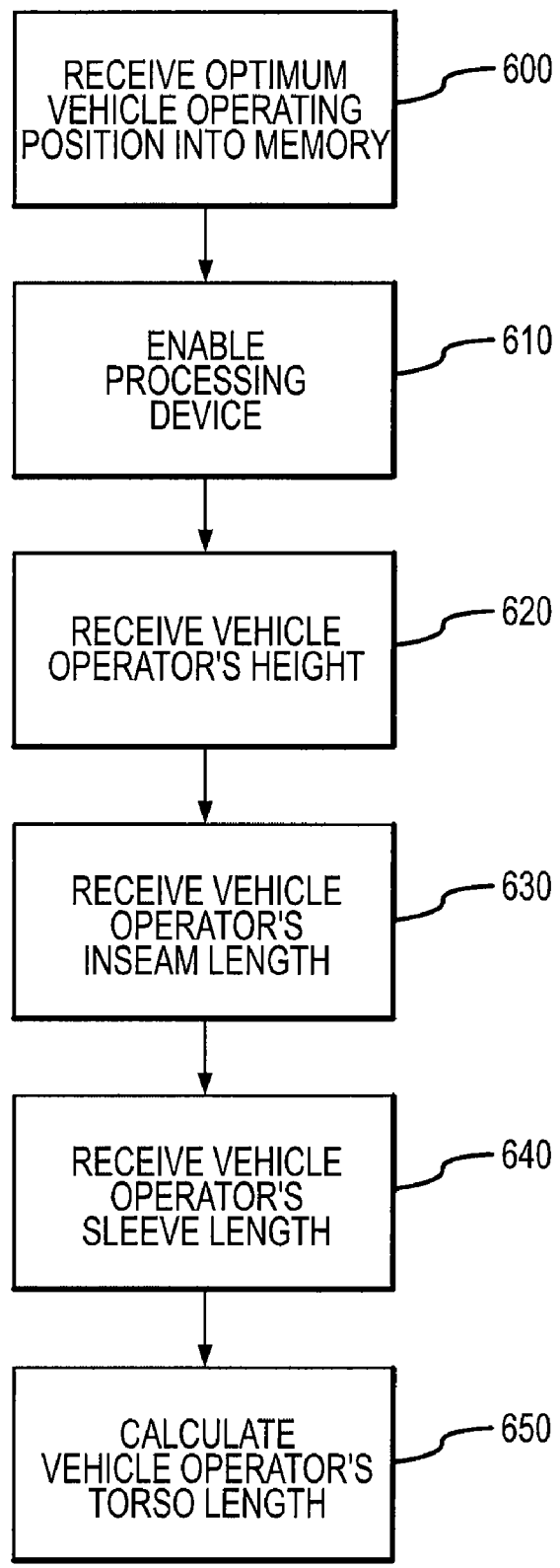
FIG. 6 is a flowchart illustrating a method for processing biometric information to calculate a vehicle operator's torso length, in accordance with the first embodiment of the invention.

The flowchart shown in FIG. 6 illustrates a method for processing biometric information to calculate a vehicle operator's torso length 700, along with the initial steps taken by processing device 405 in one embodiment of the present invention to place the vehicle operator 100 in the performance driving position 130. First, the performance driving position is received by the processing device, and optionally stored in a memory (operation 600). In operation 610, the processing device 405 is enabled (operation 610). Typically, the processing device can only be enabled when it is safe to move the vehicle operator 100 into the performance driving position 130 (e.g., the automobile is in "park," a seatbelt is fastened (or unfastened), and so forth). The exact requirement for enabling the processor may vary in alternate embodiments.

The processing device 405 then receives biometric parameters from the input device 400 entered by the vehicle operator 100 in operation 630. As shown in FIG. 6, the processing device receives the vehicle operator's height 420 (operation 620), inseam length 415 (operation 630), and sleeve length 425 (operation 640). These operations may be performed in any order. The processing device 405 then calculates the vehicle operator's torso length 700 based on the height and inseam length (operation 650).

Figure 7:
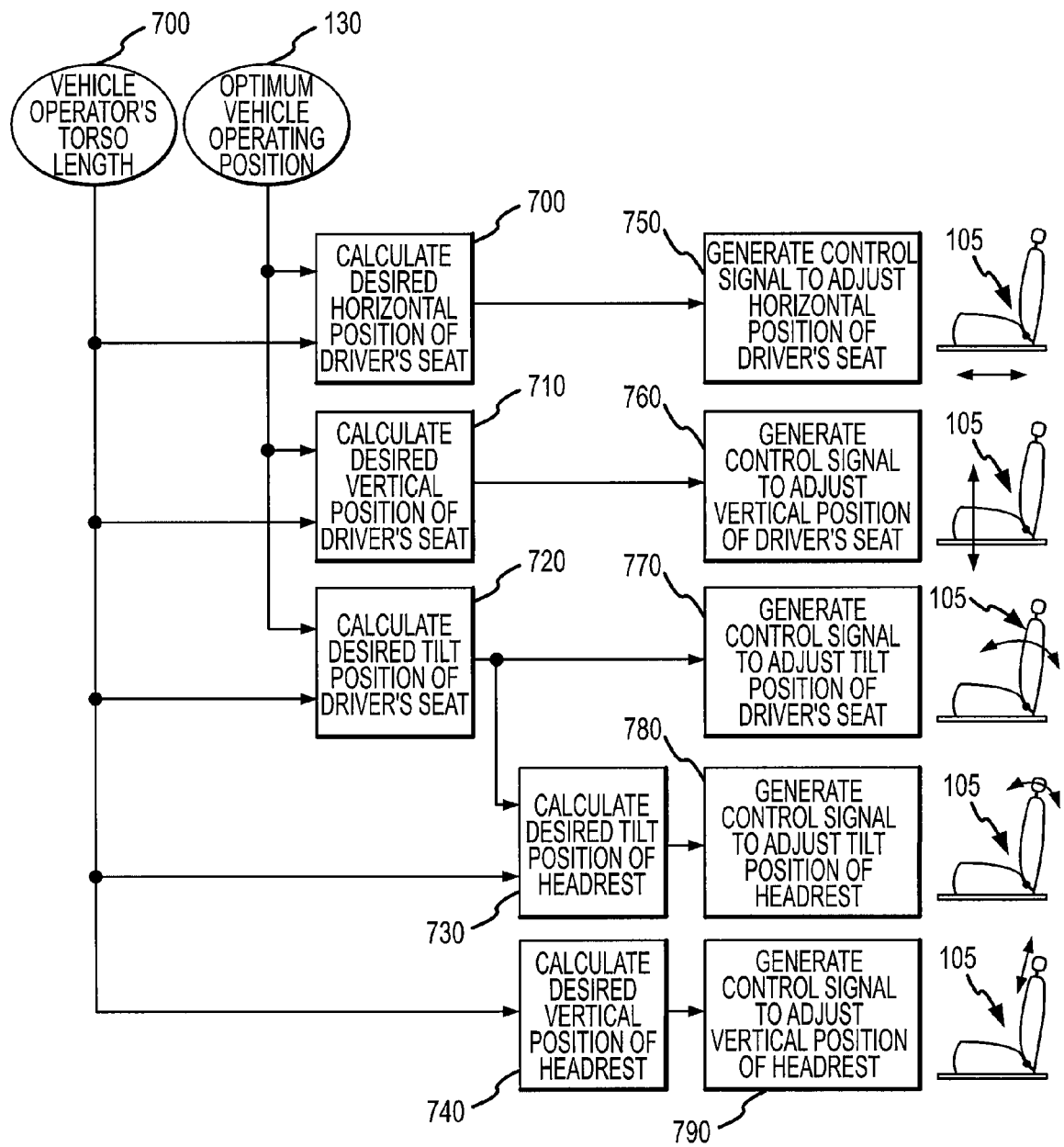
FIG. 7 is a flowchart illustrating a method for processing biometric information and the performance driving position to adjust a driver's seat position, in accordance with the first embodiment of the invention.

Once the biometric parameters are received by the processing device 405, the processing device calculates desired positions of the equipment to be adjusted on the vehicle 110, and then generates control signals based on the calculated desired positions. The steps taken by the processing device to maneuver the driver's seat 105 are shown in FIG. 7, which is similar to the driver's seat depicted in FIG. 2. Based on the vehicle operator's torso length 700 and the performance driving position 130, the processing device 405 may optionally calculate a desired horizontal position of the driver's seat 800 (operation 700), a desired vertical position of the driver's seat 805 (operation 710), and/or a desired tilt position of the driver's seat 810 (operation 720). These operations may be performed in any order. Based on the desired tilt position of the driver's seat 810 and the vehicle operator's torso length 700, the processing device may optionally calculate a desired tilt position of the headrest (operation 730). Similarly, the processing device 405 may optionally calculate a desired vertical headrest position (operation 740). Based on the calculated desired positions, the processing device may generate control signals to adjust the horizontal position of the driver's seat (operation 750), the vertical position of the driver's seat (operation 760), the tilt position of the driver's seat (operation 770), the tilt position of the headrest (operation 780), and/or the vertical position of the headrest (operation 790).

Figure 8:
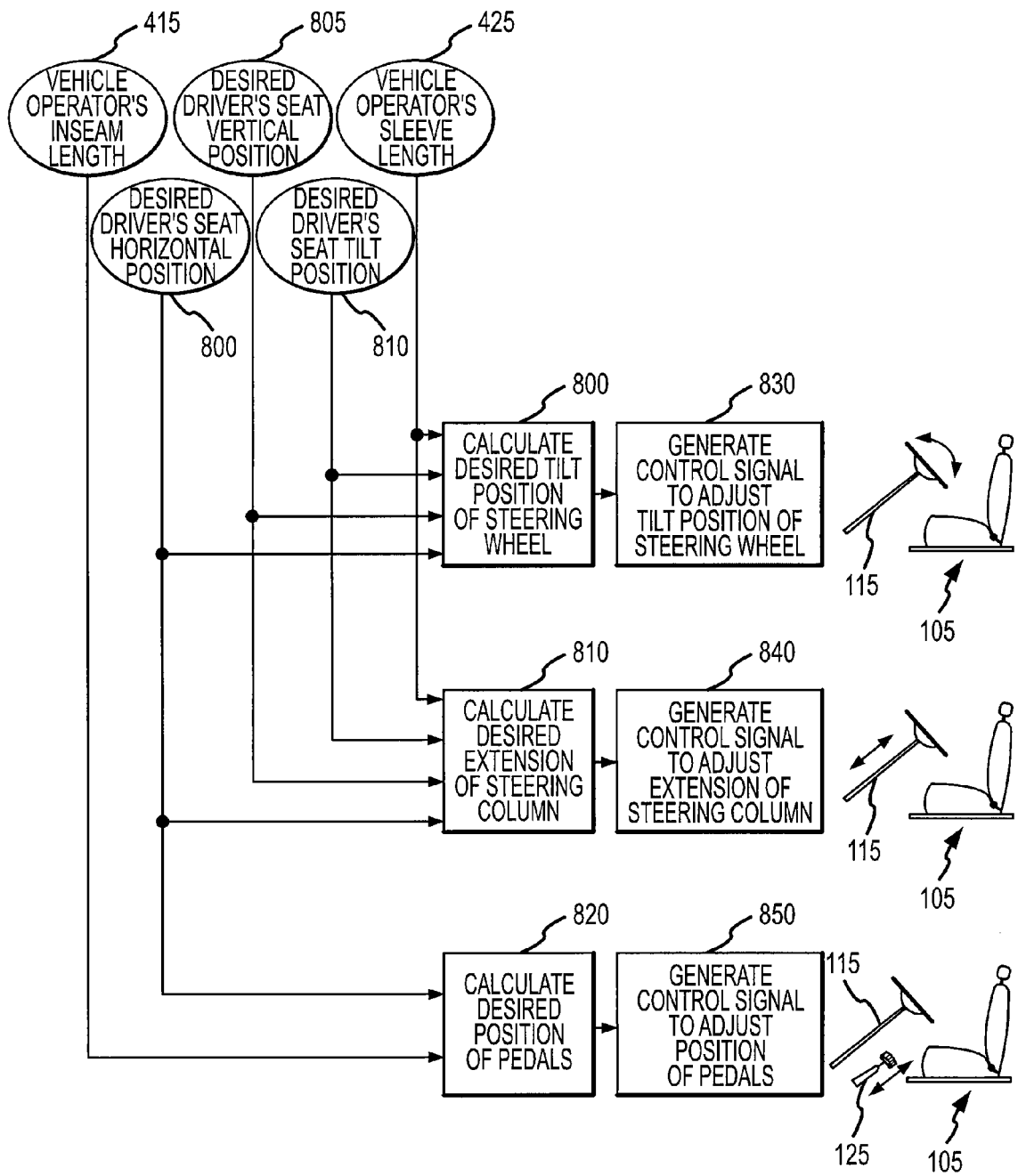
FIG. 8 a is flowchart illustrating a method for processing biometric information and seat position calculations to adjust a steering wheel position and pedal position, in accordance with the first embodiment of the invention.

Once the processing device 405 has adjusted the driver's seat 105 to match the calculated positions, and at least partially place the vehicle operator 100 in the performance driving position 130, the steering wheel 115 and pedals 125 may be positioned if necessary. As shown in FIG. 8, the processing device may calculate a desired tilt position of the steering wheel (operation 800) and/or a desired extension of the steering column (operation 810), based on a combination of one or more of the desired driver's seat horizontal position 800, the desired driver's seat vertical position 805, the desired driver's seat tilt position 810, and the vehicle operator's sleeve length 425. Alternate embodiments may employ only biometric parameters for these calculations. Further, the processing device 405 may calculate a desired foot pedal position (operation 820), based on a combination of one or more of the vehicle operator's inseam length 415 and the desired driver's seat horizontal position 800. Based on the positions calculated in operations 800-820, the processing device 405 then generates control signals to adjust the steering wheel tilt position (operation 830), the steering column position (operation 840), and/or the foot pedal position (operation 850). These operations may be performed in any order.

Figure 9:
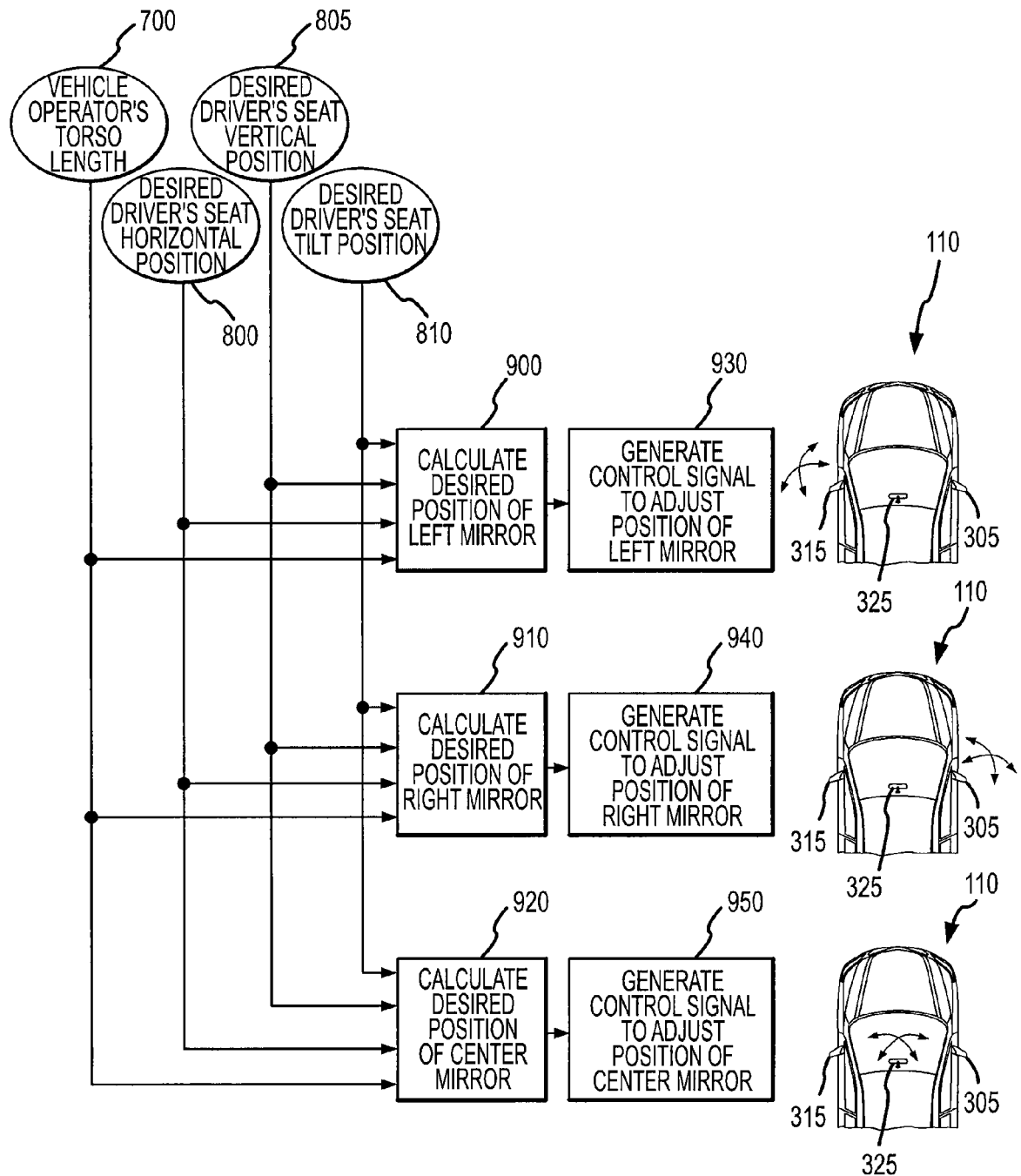
FIG. 9 a is flowchart illustrating a method for processing biometric information and seat position calculations to adjust a rearview mirror positions, in accordance with the first embodiment of the invention.

The processing device 405 may also make adjustments to the positions of the mirrors 300, as shown in FIG. 9. The processing device may calculate a desired position of the left mirror 315 (operation 900), a desired position of the right mirror 305 (operation 910), and/or a desired position of the center mirror 325 (operation 920), based on a combination of one or more of the desired driver's seat horizontal position 800, the desired driver's seat vertical position 805, the desired driver's seat tilt position 810, and the vehicle operator's torso length 700. Based on the calculated desired positions, the processing device 405 may generate control signals to adjust the left mirror (operation 930), the right mirror (operation 940), and the center mirror (operation 950).

The present invention may be configured to utilize any number of input devices capable of communicating with the particular processing device utilized. In some embodiments, the input device 400 is hard-wired to the processing device 405, while in other applications the input device may communicate remotely with the processing device (i.e., by infrared, wireless, radio frequency, and other like communication schemes). For example, the input device may be a mobile phone or remote control in communication with the processing device. In another example, the vehicle operator 100 enters the desired biometric parameters from a radio keypad in the vehicle 110.

The processing device 405 may also utilize digital processors and/or various analog devices to make the desired calculations and generate the required output signals. Some embodiments utilize a processing device or associated memory to store positions of various equipment on the vehicle 110 for particular vehicle operators 100, in order to eliminate the need to reenter biometric parameters each time a given vehicle operator uses the vehicle. In addition, the processing device 405 may be configured to remotely communicate the required control signals to the equipment on the vehicle 110 to be maneuvered. Alternatively, the processing device can be hard-wired to the equipment on the vehicle to be maneuvered.

The present invention may be further enhanced with the utilization of a three-dimensional digitizing device. One exemplary digitizing device is the ATOS 3D digitizer manufactured by GOM MbH (Gesellschaft fur Messtechnik), located in Braunschweig, Germany, although other scanning and/or digitizing devices may be used. In some embodiments, multiple scanners may be employed. Such a three-dimensional digitizing device can be used to map and record a person's biometric parameters. In turn, codes are generated and stored either in a portable storage device or within a memory associated with the vehicle for each individual that correspond with their specific biometric parameters measured by the three-dimensional digitizing device. An individual may then provide the code to the system, which, in turn, accepts or retrieves recognizes the corresponding biometric parameters and makes the necessary adjustments to place the operator in the performance driving position.

As an added enhancement, scanning and determining a person's biometric parameter(s) may be performed by a vehicle seller or other party as a service. Automobile dealers, for example, may offer to scan a purchaser and provide the purchaser's biometric parameter(s) for an additional fee when the purchaser buys the vehicle. Thus, the scanning service may provide an enhanced value service and/or revenue generating mechanism for certain parties.

Instead of providing a code or storage device to individual operators or storing parameters within the vehicle, biometric measurement data taken from the three-dimensional digitizing device may be electronically stored in an automobile ignition key. As such, the system can be configured such that when a user inserts his ignition key into the ignition of an automobile, his biometric parameters are downloaded into the processing device, which, in turn, automatically coordinates the necessary adjustments to place the operator in the performance driving position.

Although various embodiments of this invention have been described above with a certain degree of particularity or with reference to one or more individual embodiments, those skilled in the art could make numerous alterations to the disclosed embodiments without departing from the spirit or scope of this invention. For example, the invention may be applied to optimally position a vehicle passenger. In another example, the invention may be utilized to the select an optimum illumination of the gauge panel in a vehicle. It is intended that all matter contained in the above description and shown in the accompanying drawings shall be interpreted as illustrative of particular embodiments, and not limiting. Changes in detail or structure may be made without departing from the basic elements of the invention as defined in the following claims.

What is claimed is:

1. An automatic positioning system for a vehicle operator comprising:
   an operator's seat;
   an input device adapted to produce at least one input signal based on at least one biometric parameter;
   at least one processing element connected with said input device and adapted to process said at least one input signal based on a performance driving position to produce at least one output signal; wherein
   said performance driving position is based on at least one of a view of a vehicle travel surface and a vehicle instrument; and
   wherein said at least one output signal includes at least one control signal adapted to move said operator's seat to place an operator's eyes within a predefined eye ellipse and the operator's hips into a single predefined hip point determined by the at least one biometric parameter and a physical characteristic of the vehicle, the predefined eye ellipse and the predefined hip point at least partially defining the performance driving position; and
   the predefined eye ellipse is determined with reference to at least one characteristic of the vehicle.

2. The automatic positioning system of claim 1, wherein said at least one biometric parameter is selected from the group consisting of a height, an inseam length, and a sleeve length.

3. The automatic positioning system of claim 1, wherein:
   said operator's seat is adapted to move forward, rearward, upward, and downward; and
   said at least one biometric parameter includes an inseam length and a height.

4. The automatic positioning system of claim 1, wherein:
   said operator's seat includes a seat portion and a back portion;
   said back portion is adapted to tilt forward and rearward about said seat portion; and
   said at least one biometric parameter includes an inseam length, a height, and a sleeve length.

5. The automatic positioning system of claim 1, further comprising:
   at least one mirror; and
   wherein said at least one control signal is adapted to adjust said at least one mirror.

6. The automatic positioning system of claim 1, further comprising:
   a steering device; and
   wherein said at least one control signal is adapted to adjust said steering device.

7. The automatic positioning system of claim 6, wherein said steering device comprises:
   a steering wheel; and
   a steering column connected with said steering wheel.

8. The automatic positioning system of claim 7, wherein:
   said steering column is adapted to extend and retract;
   said steering wheel is adapted to tilt up and down about said steering column; and
   said at least one biometric parameter includes an inseam length, a height, and a sleeve length.

9. The automatic positioning system of claim 1, further comprising:
   at least one foot pedal;
   wherein said at least one control signal is adapted to move said at least one foot pedal; and
   wherein said at least one biometric parameter includes an inseam length.

10. The automatic positioning system of claim 1, wherein said performance driving position is based on an optimal view of a vehicle travel surface.

11. The automatic positioning system of claim 1, wherein said performance driving position is based on an optimum view of at least one vehicle instrument.

12. The automatic positioning system of claim 1, wherein said performance driving position is based on placing at least one vehicle instrument within reach of the vehicle operator.

13. The automatic positioning system of claim 1, wherein said performance driving position is based on an optimum view of a vehicle travel surface, an optimum view of at least one vehicle instrument, and placing at least one instrument within reach of the vehicle operator.

14. The automatic positioning system of claim 1, wherein said processor calculates a torso length based on a height and an inseam length.

15. The automatic positioning system of claim 1, wherein said at least one processing element further comprises a memory adapted to store a plurality of output signals for a plurality of operators.

16. The automatic positioning system of claim 1, wherein said at least one processing element comprises a computer.

17. The automatic positioning system of claim 1, wherein said input device is a mobile phone.

18. The automatic positioning system of claim 1, wherein said input device is a vehicle radio keypad.

19. The automatic positioning system of claim 1, wherein said input device is a remote control.

20. The automatic positioning system of claim 1, further comprising:
a means for mapping said at least one biometric parameter; and
a storage device for storing said at least one biometric parameter.

21. The automatic positioning system of claim 20, wherein said means for mapping said at least one biometric parameter is a scanning and digitizing device.

22. The automatic positioning system of claim 20, wherein said storage device is portable.

23. The automatic positioning system of claim 22, wherein said storage device is located on a vehicle ignition key.

24. An automobile containing the automatic positioning system of claim 1.

25. A positioning system for an automobile operator comprising:
a vehicle element;
a processor adapted to produce at least one output signal based on a performance driving position in combination with one of an operator's inseam length, a height, an a sleeve length, wherein said performance driving position is based on at least one of an optimum view of a vehicle travel surface and an optimum view of at least one vehicle instrument; and
at least one motor operative to receive said at least one output signal and, in response, adjusting said vehicle element to place a hip of the operator, when interacting with the vehicle element, in a single predefined hip point determined by the at least one biometric parameter and a physical characteristic of the vehicle, the predefined hip point at least partially defining the performance driving position and defined without regard to a driver's comfort or alertness.

26. The positioning system of claim 25, wherein said vehicle element is a driver's seat.

27. The positioning system of claim 25, wherein said vehicle element is a steering wheel.

28. The positioning system of claim 25, wherein said vehicle element is a foot pedal.

29. The positioning system of claim 25, wherein said vehicle element is a mirror.

30. The positioning system of claim 25, further comprising:
a means for mapping at least one biometric parameter; and
a storage device for storing said at least one biometric parameter.

31. The positioning system of claim 30, wherein said means for mapping said at least one biometric parameter is a scanning and digitizing device.

32. The positioning system of claim 30, wherein said storage device is portable.

33. The positioning system of claim 32, wherein said storage device is located on a vehicle ignition key.

34. The positioning system of claim 30, wherein said storage device is selectively operably coupled with said processor.

35. A method of automatically positioning an operator in a vehicle, the method comprising:
creating an input signal from at least one biometric parameter;
processing said input signal based on an optimum operating position to produce at least one output signal; and
moving a seat based on said output signal to place an eye of an operator seated in the seat into a predefined eye ellipse and a hip of the operator into a predefined hip point so as to allow the operator to operate the vehicle, the predefined hip point based at least partially on the predefined eye ellipse, the eye ellipse and hip point defining the optimum operating position and determined without reference to an operator preference; wherein
the performance driving position defines one of: a least restricted view of one of a vehicle travel surface; a least restricted view through a window of the vehicle; a least restricted view of at least one instrument of the vehicle; and an optimal position for reaching at least one instrument of the vehicle.

36. The method of claim 35, wherein said step of moving includes moving at least one mirror.

37. The method of claim 35, wherein said step of moving includes moving a steering device.

38. The method of claim 35, further comprising the steps of:
measuring said at least one biometric parameter; and
storing said at least one biometric parameter.

39. The system of claim 25, wherein the performance driving position defines one of: a least restricted view of one of a vehicle travel surface; a least restricted view through a window of the vehicle; a least restricted view of at least one instrument of the vehicle; and an optimal position for reaching at least one instrument of the vehicle.

40. The method of claim 35, wherein the biometric parameter is obtained by scanning an operator's body to determine the biometric parameter.

41. The method of claim 40, wherein the operation of scanning the operator's body comprises obtaining a three-dimensional digital image of the operator's body.

42. The method of claim 35, wherein the performance driving position is defined without reference to comfort or alertness of an operator.

* * * * *